United States Patent [19]
Hegel et al.

[11] Patent Number: 4,716,952
[45] Date of Patent: Jan. 5, 1988

[54] MEANS FOR SQUARING TIE BARS FOR DIE CASTING MACHINES

[75] Inventors: Robert W. Hegel; William V. Appledorn, both of Holland, Mich.

[73] Assignee: Prince Corporation, Holland, Mich.

[21] Appl. No.: 873,808

[22] Filed: Jun. 12, 1986

[51] Int. Cl.⁴ .............................................. B22D 17/26
[52] U.S. Cl. .................... 164/154; 164/150; 164/312; 164/303
[58] Field of Search ............... 164/150, 154, 303, 312; 425/589; 74/405

[56] References Cited
U.S. PATENT DOCUMENTS

Re. 32,084 12/1985 Prince .................................. 164/154
4,285,384 8/1981 Wunder ................................ 164/154

FOREIGN PATENT DOCUMENTS

57-31461 2/1982 Japan ................................... 164/150

Primary Examiner—Nicholas P. Godici
Assistant Examiner—Richard K. Seidel
Attorney, Agent, or Firm—Price, Heneveld, Cooper, DeWitt & Litton

[57] ABSTRACT

A system and machine for squaring tie bars for die casting machines in which a detector means is provided for each of the tie bar nuts for separately and individually detecting the relative positions of the tie bar nuts of each of the tie rods whereby when the machine is originally squared by adjusting the adjustable means, the original squared positions of the nuts are detected and after operation of the machine it can be resquarded by adjusting said adjustable means to adjust said tie bar nuts back to their original squared positions. This adjustment is automatically accomplished through a logic circuit which controls the adjustment of the tie bar nuts.

31 Claims, 8 Drawing Figures

MEANS FOR SQUARING TIE BARS FOR DIE CASTING MACHINES

The present invention relates to die casting machines of the type having tie bars and particularly to a system for resquaring the platens of the machine to their original square position.

In die casting machines of the type disclosed in U.S. Pat. RE No. 32,048 entitled TIE BAR ADJUSTMENT SYSTEM and in U.S. Pat. No. 4,466,477 entitled DIE CASTING MACHINE WITH STRAIN GAUGE, platens are provided between which the mold or die is located. One of these platens at the front of the machine is stationary and the other platen is a traveling platen which opens and closes the die or mold located between the two platens. Normally four tie rods are provided at the corners of the platens. These tie rods are secured to the front platen and also to a rear end plate. The traveling platen slides on these tie rods and is actuated by a hydraulic cylinder actuated toggle located between the traveling platen and the rear end plate. Located on the ends of the tie rods at the rear end plate are adjustment nuts or tie rod nuts, one for each of the tie rods, for adjusting the tension for each of the tie bars, it being desirable that the four tie bars share equally in the lock-up force exerted on the die when the traveling platen is in the lock-up position.

When a die casting machine is originally built and before it is delivered, the manufacturer generally squares the machine, i.e., adjusts the adjustment nuts on the tie bars so that the two platens are parallel. This is accomplished by placing a squaring block between the front platen and the traveling platen and adjusting the tie rod nuts so that the tie bars share equally in the lock-up force exerted on the squaring block which has front and rear faces parallel to a known tolerence. In other words, a squaring block is inserted between the front and traveling platens and the traveling platen is actuated to the closed or lock-up position. Strain measurements are made on the tie bars to determine if load is uniform among them. If not, the traveling plate is actuated to the open position. Then the adjustment nuts on the ends of the tie rods are adjusted. The traveling plate is then again actuated to the closed position and strain measurements are again made. This process is repeated until the identical strain is being exerted in each of the tie bars. When the strain is the same in each tie bar, the machine is said to be "square", that is, there is equal tonnage on all corners of the squaring block simultaneous with the faces of the platens being parallel to a known tolerence.

After the die casting machine is delivered, frequent operation of the same on almost a continuous basis causes wear and tear on the die and when metal leaks between the die halves the assumption may be that the machine is not square. A measure of the strain on each tie rod may determine that the strain in each tie rod is substantially different.

In this case the remedy is to adjust the tie bars, after using the automatic method disclosed in U.S. Pat. RE No. 32,048, so that equal tie bar strain and therefore load distribution on the die is accomplished. This then permits continued use of dies with minimum metal leakage or flash, in spite of the fact that said die is no longer clamped by parallel platens. Use of the die casting machine in this manner is desirable in order to overcome the wear and tear on dies and thus extend their useful lives. It is also desirable in the case where dies have complex, non-uniform components which can operate at different temperatures and can develop non-parallel faces during normal operation.

The difficulty arises when another die is placed in the machine at a different temperature state, or when an existing die becomes worn to the point when continued application of non-parallel clamping would be inadvisable. For purposes of rapid attainment of equal clamping on another die, or determination of the non-parallel condition of a new die, it would be desirable to achieve the condition mentioned earlier as "square". This "square" condition is attainable by use again of a squaring block, but the frequent installation of said squaring block is time consuming since it requires the removal of the die.

Because of the difficult, time consuming, costly operation involved in squaring a machine with a squaring block, some operators have taken the position that the machine should never be adjusted and when metal leaks between the die halves, or the die cast article is imperfect, the die should be modified to correct the problem and imperfections. However, such practice has not been completely satisfactory because of the differences in the cross-sectional shapes of the dies which causes the dies when repaired in one area of the die to result in non-compliance in another area. Therefore, there has existed a long-felt need for a means to resquare die casting machines to their original-as-built square position.

SUMMARY OF THE INVENTION

In accordance with this invention, we provide a very simple means of resquaring a die casting machine. Our system is based upon the accurate assumption that all tie rods on a given machine have substantially the same, identical elasticity and, also, there is no permanent deformation in the tie bars caused by exerting different tension on each of the tie bars. In accordance with this invention, we initially determine the position of the adjustment nuts on the tie bars and the position of each nut relative to each other when the machine is originally squared with a squaring block as described above. We then provide means at each adjustment nut for detecting the position of each nut on its tie rod. In so determining the position of the adjustment nuts on the tie rods and the relative position of the nuts to each other, our system acts like a micrometer to detect and indicate any change in the position of each adjustment nut on its tie rod.

Having determined the position of each adjustment nut relative to each other, we utilize the automatic tie bar adjustment system of U.S. Pat. RE No. 32,048 entitled TIE BAR ADJUSTMENT SYSTEM and issued on Dec. 17, 1985, to readjust each adjustment nut independently and separately until the relative positions of each of the adjustment nuts on their tie rod and to each other are reset to the original position of such adjustment nuts at the original squaring of the machine.

In accordance with the broader aspects of this invention the detection of the position of each adjustment nut on its tie rod can be accomplished by an operator that sequentially adjusts each adjustment nut. However, in the preferred embodiment of this invention, we provide an automatic means including a logic circuit programmed for sequentially detecting when each of three tie bars is out of square relative to a reference bar, and thereafter sequentially adjusting each nut so as to return the platens to their original square position. In this automatic adjustment, the entire machine can be squared within five or ten minutes.

With such a system, therefore, it is possible to automatically resquare a machine between casting cycles and thereby determine whether problems such as metal leaks between the die halves or casting imperfect articles are being caused by a bad or imperfect die, flash build-up, or an unsquare machine. Thus, our system can be utilized to insure uniform quality castings. It also lengthens the life of the machine which otherwise, to its detriment, might be utilized with faulty dies and also lengthens the life of dies by avoiding the application of large concentrated loads in order to detect non-parallel platens.

These and other features, advantages and objects of the present invention will be best understood by reference to the following description thereof together with the drawings in which:

DETAILED DESCRIPTION OF THE PREFERRED EMBODIMENT

Figure 1:
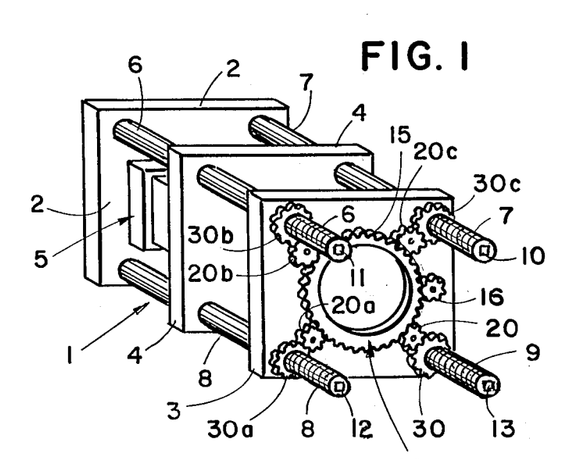
FIG. 1 is a fragmentary, pictorial view of a die casting machine of the type with which this invention is utilized.

Referring to FIG. 1, a die casting machine 1 is shown in pictorial form and includes a front stationary plate or platen 2, a rear, stationary plate 3 and a movable or traveling plate or platen 4. The movable plate or platen 4 is positioned between the front or rear plates and movable therebetween by a toggle mounted between the plates 3 and 4 and generally actuated by a hydraulic cylinder (not shown). On the rearward facing surface of the plate 2, there is attached one-half of a die 5 while the corresponding mating half of the die is mounted on the front surface of the movable platen 4. Plate 4 is slidably mounted on four tie bars 6, 7, 8 and 9 which are secured at one end to the front plate or platen 2 and at the opposite end to the rear plate 3 by means of their threaded ends which can be threaded sleeves and collars as specifically described in U.S. Pat. RE No. 32,048 and disclosed in FIG. 3 as will be described hereinafter. It should be understood that the threaded tie bars can be integral threads cut into the ends of the tie bars or can be the threaded sleeves and collars as disclosed in FIG. 3. Associated with the tie bars 6, 7, 8 and 9 are the strain gauges 10, 11, 12 and 13 of a type such as that described in U.S. Pat. No. 4,466,477 and U.S. Pat. RE No. 32,048, the descriptions of which are incorporated in this application by reference since it is not considered essential to describe such strain gauges in detail because of the disclosure in such patents.

As previously referred to, the die casting machine 1 also includes a hydraulic ram and a toggle linkage (not shown) coupled between the rear plate 3 and the movable platen 4 for advancing the movable platen into a locked-up casting position with the die closed and for retracting the movable platen 4 away from the stationary front platen 2 for opening the die to remove the cast part. The die casting machine 1 is of the general type as disclosed in U.S. Pat. No. 3,407,685, issued Oct. 29, 1968, U.S. Pat. No. 4,256,166, issued Mar. 17, 1981, and U.S. Pat. RE No. 32,048, issued Dec. 17, 1985, such patents all being assigned to the present assignee. U.S. Pat. RE No. 32,048, and the disclosure thereof is to be considered incorporated by reference into this patent because it discloses in greater detail the automatic tie bar adjustment means utilized by this invention.

Mounted to the rear surface of rear plate 3 for rotation in a conventional fashion is the bull ring gear 14 having the peripheral teeth 15 engaged by the driver gear 16. The teeth 15 of the bull or ring gear 14 engage the longitudinally movable idler gears 20, 20a, 20b and 20c. As disclosed in FIG. 1, idler gears 20, 20a, 20b and 20c in turn selectively engage adjustment nuts or so-called tie bar nuts 30, 30a, 30b and 30c, which in turn engage the threaded ends associated with each of the tie bars 8, 9, 7 and 6, respectively. Thus, when the ring or bull gear 14 is rotated by the drive gear 16, those tie bars having their adjustment nuts in engagement with an idler gear will have their tension adjusted. The tension adjustment of the tie bars is accomplished during the die open position of operation while the result of the adjustment is monitored during lock-up.

Although the disclosure of U.S. Pat. RE No. 32,048 is incorporated by reference into this application, reference is made to FIGS. 2, 3, and 5 for a brief description of the adjustment mechanisms for each tie bar of the die casting machine 1. In respect to these figures, it should be understood that the mechanism is identical for each of the four tie bars shown in FIG. 1.

Figure 2:
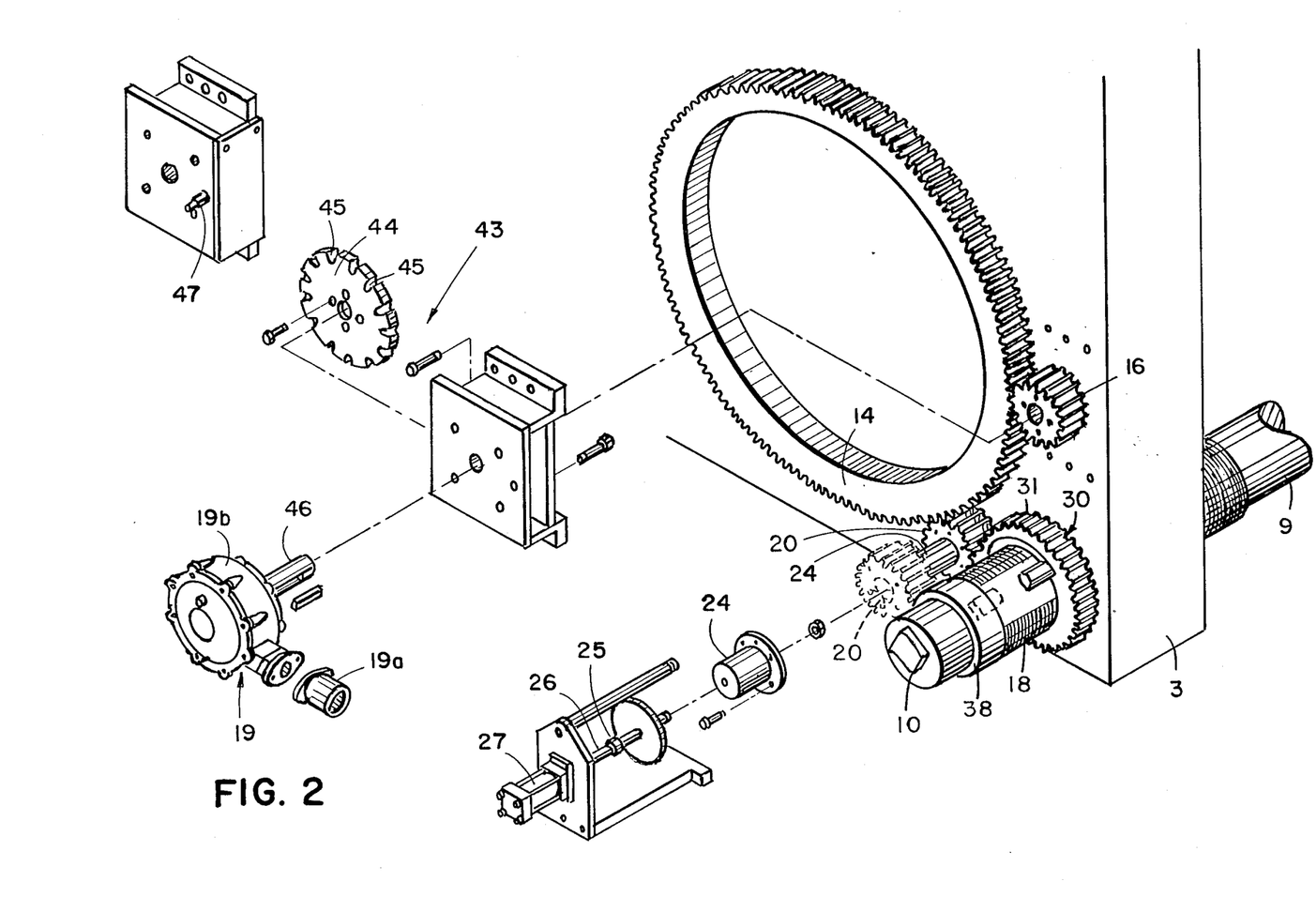
FIG. 2 is an exploded, perspective view of certain components of the resquaring mechanism of this invention.
Figure 3:
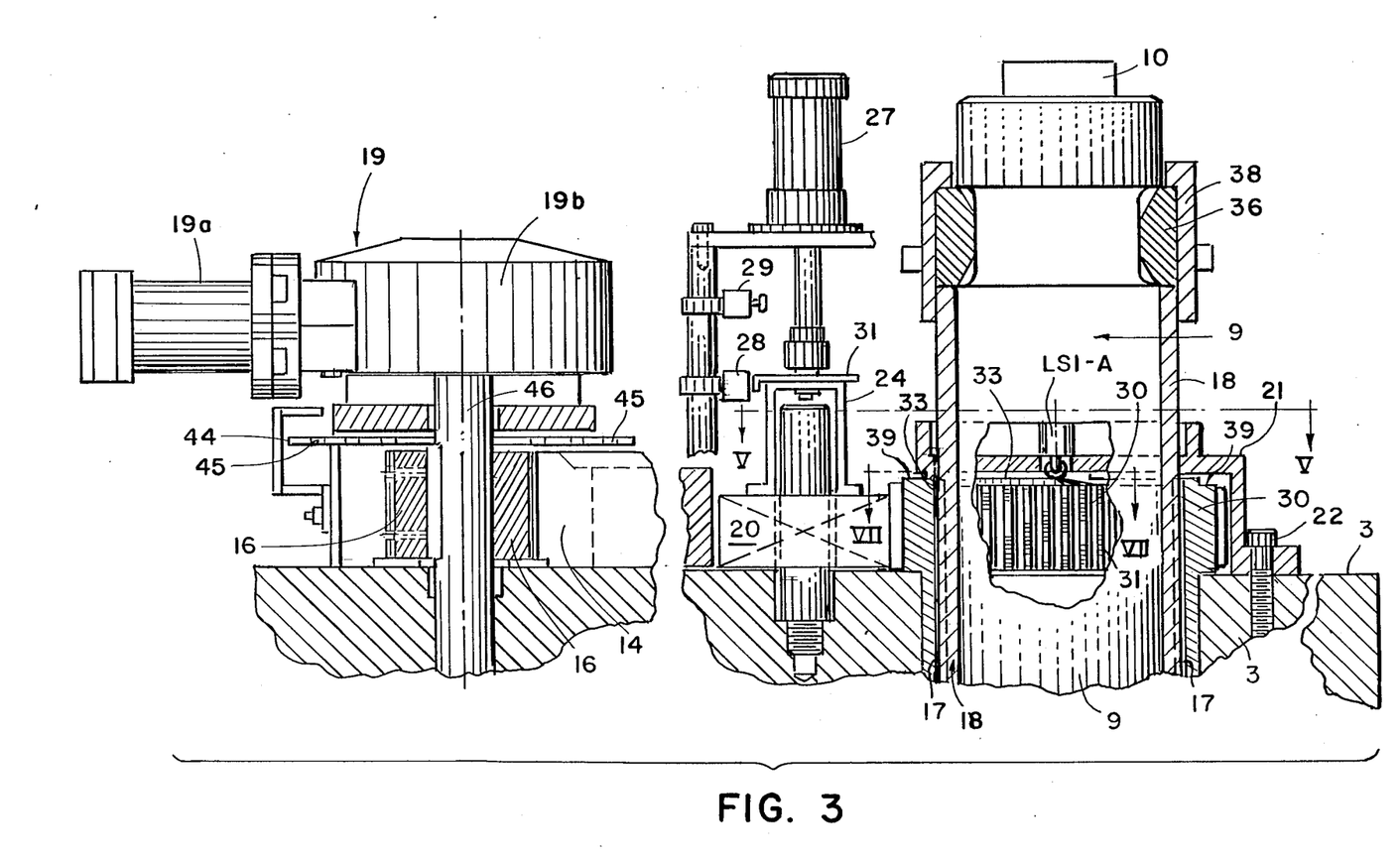
FIG. 3 is a fragmentary, cross-sectional view of the tie bar resquaring mechanism of the present invention.

FIGS. 2 and 3 disclose the lower right (as seen in FIG. 1) tie bar adjustment mechanism for the tie bar 9. Tie bar 9 extends through an aperture 17 (FIG. 3) in the lower right hand corner of the rear plate 3. The tie bar 9 as disclosed includes the cylindrical sleeve 18 fitted over and retained on the end of the tie bar 9 by means of the retainer 36 held in place by the cap 38, all as disclosed in U.S. Pat. RE No. 32,048.

Threaded on sleeve 18 is the adjustment nut 30 which has the external teeth 31. As disclosed in FIG. 3, the adjustment nut 30 is retained on the rear plate 3 by means of the retainer member 21 which is secured to plate 3 by the bolts 22. Retainer member 21 includes an opening which exposes the teeth of the adjustment nut 30 and permits the idler gear 20 to engage the peripheral teeth 31 of the adjustment nut 30. This idler gear mechanism is shown in both FIGS. 2 and 3. FIG. 2 discloses the idler gear in solid lines engaging both the adjustment nut 30 and the bull ring 14 whereby rotation of the bull ring 14 rotates the idler gear 20 which in turn engages the teeth 31 on adjustment nut 30 for adjustment of the tie bar tension. FIG. 2 also discloses the idler gear in phantom lines disengaged from the bull gear 14 and the adjustment nut 30 although in order to maintain sync of the gear teeth the arrangement of the gears can be made to cause the idler gear to remain partially engaged with the bull gear but disengaged from the nut. This is achieved by the idler gear being mounted on a riser bracket 24 which in turn is attached to a coupler rod 25 secured to the shaft 26 of the hydraulic cylinder 27.

The stroke of cylinder 27 is such that when the shaft is fully extended, the idler gear is in engagement between both gear 14 and the adjustment nut 30 as seen in FIGS. 2 and 3. A pair of limit switches 28 and 29 provide forward and rear position indication to a control circuit in response to the engagement of the limit switch actuator plate 34.

Both FIGS. 2 and 3 disclose the means for rotating the bull ring gear 14, such means including the driver gear 16 coupled to the shaft 46 of a bull gear drive 19 which includes the gear reducer actuator 19b actuated by the hydraulic motor 19a. Motor 19a is reversible to cause rotation of shaft 46 in a counterclockwise or clockwise direction as determined by solenoid valves not disclosed in FIGS. 2 and 3, but shown schematically in block form in FIG. 6 as solenoid valves 41 and 42.

In order to control the bull gear so that as it is rotated it is rotated incremental distances, a means is provided for detecting the rotational position and controlling the same. This means includes a disc 44 mounted on the shaft 46 of the actuator or gear reducer 19. This disc is rotated along with the drive gear 16 by the gear reducer 19. The slotted disc 44 includes a plurality of radially, inwardly extending angularly spaced slots 45 located around the entire periphery of the disc. On one side of the disc is a light source (not shown) provided to project a light through one slot as the disc is rotated. On the other side of the disc is the light sensor 47 (FIG. 2) positioned to detect the light projected through one of the slots 45 and generate a signal which is fed to the logic circuit 40 as will be described. The diameter of the drive gear 16 and the spacing of slots 45 are selected such that a signal is developed by sensor 47 when the bull gear rotates an angular distance corresponding to one tooth. Accordingly the rotation of the bull gear is controlled to move in tooth-to-tooth increments.

Because the description of the operation of the adjustment mechanism is clearly described in U.S. Pat. RE No. 32,048, it is not considered necessary to repeat the operation of the tie bar adjustment mechanism. It should be understood that as disclosed in said patent, the adjustment always takes place when the machine is not locked up, thereby relieving tension on the tie bars so that the threaded sleeve can be easily adjusted.

In both the manual and automatic adjustments as described in U.S. Pat. RE No. 32,048, it should be understood that the adjustments are made in response to the tension on each of the tie bars, i.e., the tie bars are individually adjusted to maintain the tie bars within the prescribed tension limits programmed either manually or through a logic circuit. In either mode, the adjustment be it done manually or automatically does not take into account that the adjustment in the tie bars required to maintain the prescribed tension in each tie bar may be due to a worn or faulty die or to a flash build up in the die. The present invention, utilizing the mechanism as disclosed in U.S. Pat. RE No. 32,048, provides a means for resquaring the platens of the die casting machine without regard to whether the die is worn and faulty or whether flash is built up.

Figure 4:
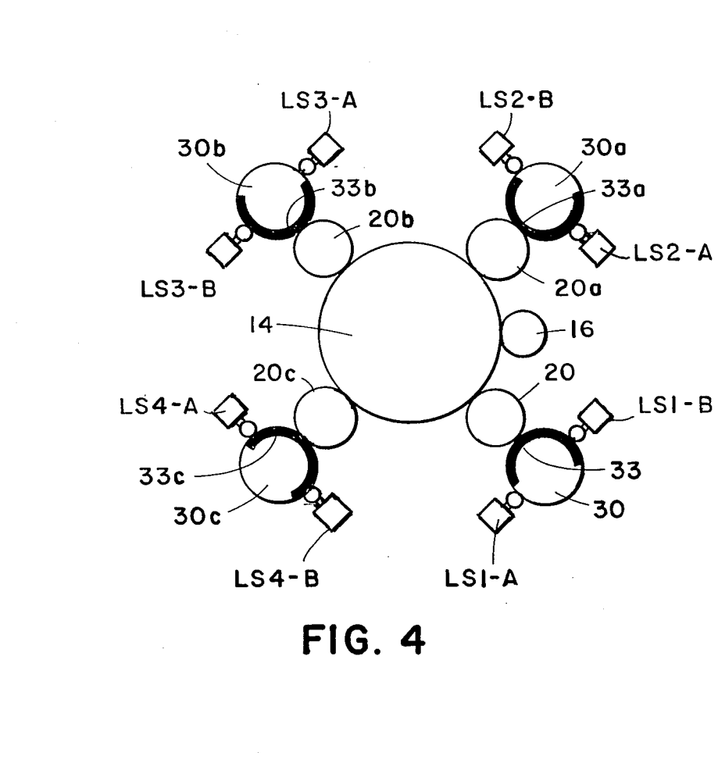
FIG. 4 is a schematic view illustrating the sensors employed in the system of this invention.

In accordance with this invention, we provide a system schematically illustrated in FIG. 4. This system includes a detector means associated with each of the adjustment nuts 30, 30a, 30b, and 30c. This detector means includes limit switches LS1-A and LS1-B for adjustment nut 30, LS2-A and LS2-B for adjustment nut 30a, LS3-A and LS3-B for adjustment nut 30b, and LS4-A and LS4-B for adjustment nut 30c. Each pair of these limit switches is actuated by a half ring limit switch actuator 33, 33a, 33b, or 33c provided for the adjustment nuts 30, 30a, 30b, and 30c, respectively. The actuators are mounted circumferentially on the adjustment nuts and cannot extend more than 180° about the circumference of the adjustment nuts. The half ring limit switch actuators are all located radially toward the bull gear, i.e., adjacent the idler gears 20, 20a, 20b, and 20c.

In accordance with this system, when the die casting machine is originally squared by use of a squaring block as previously described, each of the half ring limit switch actuators 33, 33a, 33b and 33c are in the position radially toward the bull gear and actuating all of the limit switches LS1-A, LS1-B, LS2-A, LS2-B, etc. In this position, the limit switches for each associated adjustment nut are actuated simultaneously to designate the original squared position of the nut. Thus, so long as all of the limit switches are actuated the die casting machine is squared. However, if only one of the pair of limit switches is actuated, this indicates that the tie rod associated with such pair is out of square and specifically the switch which is not actuated would designate the direction the nut had to be turned to bring the tie bar back to the squared position.

Figure 5:
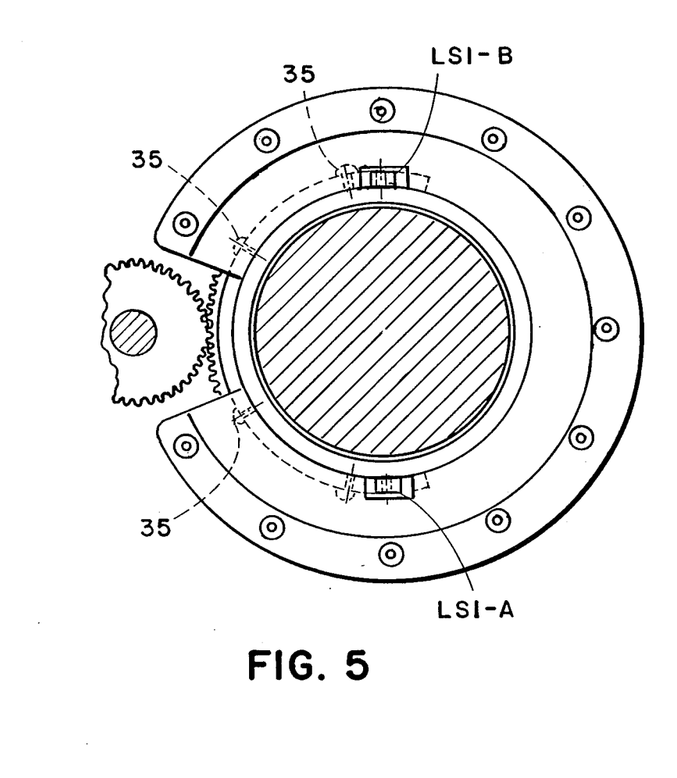
FIG. 5 is a cross-sectional view taken along the plane V—V of FIG. 3.
Figures 7, 8:
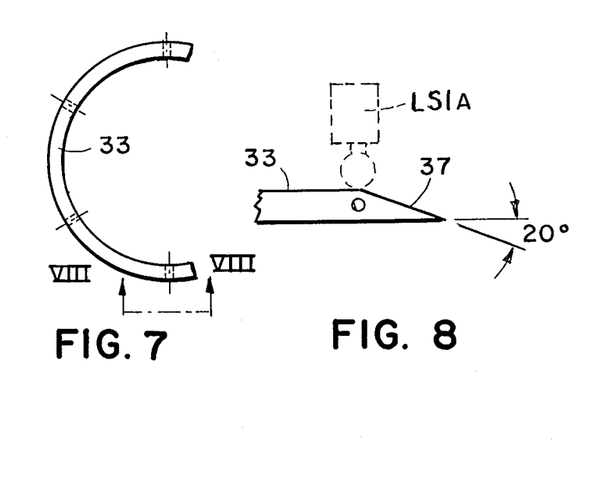
FIG. 7 is a cross-sectional view of the ring limit switch actuator taken along the plane VII—VII of FIG. 3.
FIG. 8 is a side-elevational view of the ring limit switch actuator viewed in the direction of the arrows VIII—VIII of FIG. 7 and showing one of the limit switches in phantom.

The structure for accomplishing the system of FIG. 4 is disclosed in FIGS. 2, 3 and 5. Specifically, the half ring limit switch actuator 33 is mounted on the top peripheral surface 39 of the adjustment nut 30, it being important that the switch actuators are exactly positioned to actuate all the switches when the machine is square. Only then are the ring switch actuators secured in place on the adjustment nuts by means of the roll pins 35 (FIG. 5). It is also important that the limit switches such as LS1-A and LS1-B be exactly positioned at the very peak of the ramp 37 as illustrated by FIG. 8. It should be understood that each of the switch actuators 33, 33a, 33b and 33c are mounted in similar fashion while the machine is square, the square of such machine being determined by inserting a squaring block between the two platens 2 and 4, actuating the movable platen 4 to lock position and then adjusting the nuts individually as previously disclosed until the strain in the tie bars is all identical at which time the machine is square, i.e., there is equal tonnage on all corners and the platens are parallel by virtue of the parallel faces of the squaring block.

Having assembled the ring switch actuators 33, 33a, 33b and 33c and limit switches LS1-A and LS1-B etc. on their respective adjustment nuts 30, 30a, 30b and 30c, after operating the machine it is simple to determine the squareness of the machine by checking each of the limit switches to determine if they are actuated or not. Such determination is accomplished by providing the indicator lights 51a, 51b, 52a, 52b, 53a, 53b, 54a and 54b (FIG. 6), one for each of the limit switches. If all of the limit switches are actuated as determined by the indicator lights the machine is square. However, if any one limit switch is not actuated, as determined by an indicator light, the tie bar which is out of square can be easily spotted. To resquare such tie bar, all of the idler gears except for the one associated with the tie bar that is out of square, are disengaged from their associated tie bar adjustment nuts. The bull gear is then driven in the proper direction until both of the limit switches for the tie bar which was out of square are actuated indicating that such tie bar now is in the original squared position. This can be repeated for any of the tie bars which are indicated to be out of square.

Although within the broadest aspect of this invention the die casting machine can be squared as above described by merely adjusting each of the tie bars which were indicated to be out of square, in the preferred embodiment of this invention the resquaring of the machine is accomplished by an automatic control system for adjusting the tie bars to the original squared position. This is done individually but in a programmed sequence so that the entire resquaring is accomplished automatically without any observance or manual adjustments or actuations by the operator except for initiating the programmed sequance.

Figure 6:
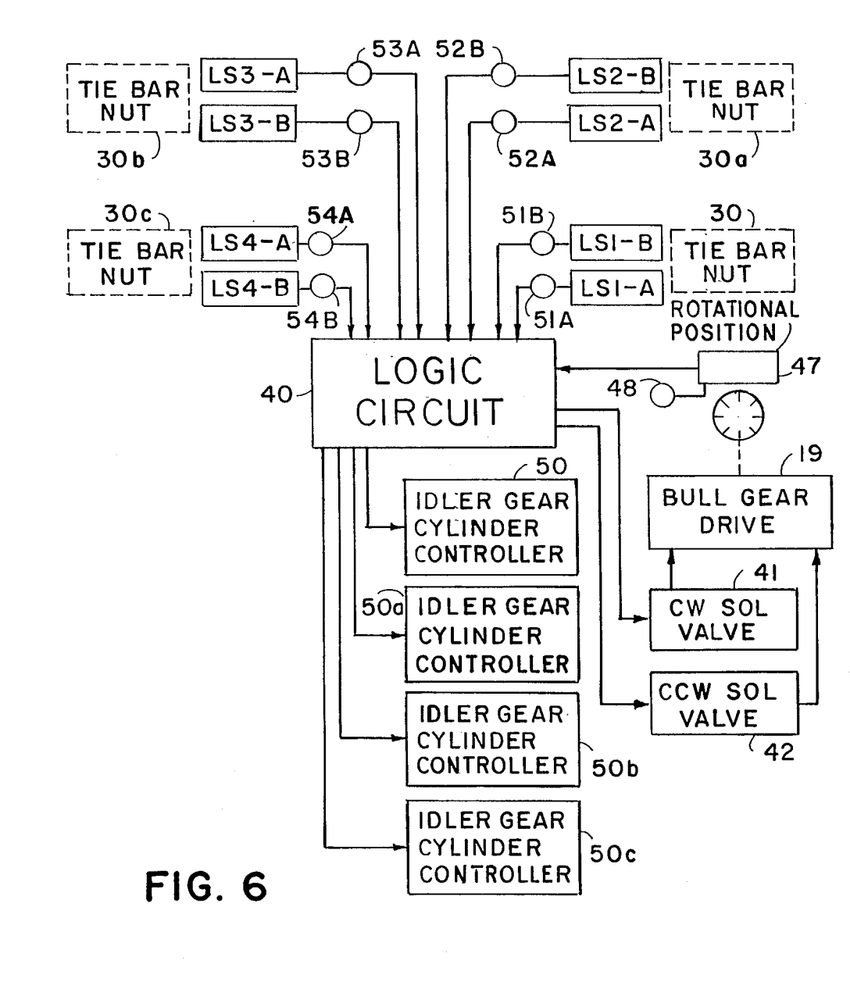
FIG. 6 is an electrical block diagram illustrating the control system for the resquaring mechanisms of the present invention.

FIG. 6 discloses in block diagram form a control circuit the exact details of which are well within the purview of one skilled in the art, particularly when considering the disclosure of U.S. Pat. RE No. 32,048. The diagram of FIG. 6 discloses a logic circuit 40 into which is fed signals from the limit switches LS1-A, LS1-B, LS2-A, LS2-B, LS3-A, LS3-B, LS4-A and LS4-B. The logic circuit 40 responds to these various input signals to provide output control signals to the idler gear cylinder controllers 50, 50a, 50b, and 50c which in turn independently and separately control the hydraulic cylinders 27 for each of the idler gears 20, 20a, 20b, and 20c, respectively. The logic circuit in responding to the signals from the limit switches also control the actuation of the bull gear drive 19.

It should be understood that the logic circuit 40 controls the sequence in which each of the positions of the tie bar nuts are adjusted and checked. Such sequence programmed by the logic circuit is also important in the positioning of the nuts in their "home positions" in which the machine is squared. Such sequential positioning involves rotating nut 30 in a clockwise direction to its "home position" wherein LS1-A and LS1-B are both actuated and then sequentially checking and adjusting the positions of nuts 30a, 30b and 30c, respectively. As an example of such adjustments, reference is made to FIG. 4 which discloses that the ring actuator 33 is actuating switch LS1-B but not LS1-A. Thus, the logic circuit detecting this condition of limit switches LS1-A and LS1-B generates a signal to the clockwise solenoid valve 41 causing the bull gear drive to rotate drive gear 16 in a clockwise direction which in turn rotates ring gear 14 in a counterclockwise direction, idler gear 20 in a clockwise direction and tie bar nut 30 in a counterclockwise direction until the ring actuator 33 of the bar nut actuates both limit switches LS1-A and LS1-B. Upon such limit switches being both actuated, the logic circuit causes idler gear controller 50 to actuate hydraulic cylinder 27 to pull the idler gear 20 out of engagement with the bull gear 14 and tie bar nut 30.

The second sequential step produced by the logic circuit 40 is to check the position of nut 30b by detecting the actuation or nonactuation of limit switches LS2-A and LS2-B associated with tie bar nut 30a. As disclosed in FIG. 4, limit switch LS2-A is actuated but LS2-B is not actuated. Thus, the logic circuit causes the actuation of the counterclockwise solenoid valve 42 which causes counterclockwise rotation of drive gear 16 which through the ring gear 14 and idler gear 20a rotates the tie bar nut 30a in a clockwise direction until both limit switches LS2-B and LS2-A are actuated which determines the "home position" of nut 30b. At such time the logic circuit 40 causes idler gear cylinder controller 50a to actuate the hydraulic cylinder 27 associated with tie bar nut 30a to pull the idler gear 20a out of engagement with the tie bar nut 30a and ring gear 14.

The third sequential step performed by the logic circuit 40 is to control the adjustment of the tie bar nut 30b in response to the actuation or deactuation of limit switches LS3-A and LS3-B. The logic circuit checks the orientation of tie bar nut 30b by responding to the signals from the limit switches LS3-A and LS3-B. If LS3-A is actuated and LS3-B is not, or vice versa, the logic circuit responds thereto by actuating either the counterclockwise solenoid valve 41 or the counterclockwise solenoid valve 42 in the way as described in relation to the adjustment of the tie bar nuts 30 and 30a. This causes the bull gear drive 19 to rotate the drive gear 16 and the bull gear 14 in the proper direction causing both limit switches LS3-A and LS3-B to be simultaneously actuated by the ring actuator 33b. When these limit switches are simultaneously actuated the logic circuit signals to the idler gear cylinder controller 50b causing the hydraulic cylinder 27 associated with the idler gear 20b to pull the idler gear 20b out of engagement with the bull gear 14 and the tie bar nut 30b.

The fourth sequential operation performed by the logic circuit is the control of the bull gear drive in response to the actuation or deactuation of the limit switches LS4-A and LS4-B associated with the tie bar nut 30c. The signals generated by limit switches LS4-A and LS4-B, depending upon whether they are actuated or not, are fed to the logic circuit which causes actuation of either of the clockwise solenoid valve 41 or counterclockwise valve 42 which in turn controls the actuation of the bull gear drive that rotates the drive gear 16 which in turn rotates the bull gear drive in a manner as above described in relation to the tie bar nuts 30, 30a and 30b. Upon all the limit switches LS4-A and LS4-B being actuated simultaneously, the logic circuit causes the idler gear cylinder controllers 50, 50a, and 50b to cause actuation of the hydraulic cylinders 27 associated with the idler gears 20, 20a and 20b causing all of the idler gears to be reengaged with their respective tie bar nut and the bull gear. The tie bar nuts are now in the same relative orientation to the tie bar as when the machine was originally squared. Thus, if there is any indication of different strains in the tie bar, it is known that either the die is worn or faulty, flash is built up on the die or that there has been uneven wear of the toggle bushings.

It should be understood that during each of the sequential steps described above the operation of the logic circuit is controlled by the photosensor 47 to rotate the bull gear incremental distances corresponding to tooth-to-tooth increments all as described above. Further, it should be understood that the adjustment of the tie rods by the tie rod nuts is never more than 180°.

In accordance with this invention, the automatic square testing can be accomplished by providing visual indications from each of the indicator lights 51a, 51b, etc. for the limit switches LS1-A, LS1-B, etc., so that one can actually visualize whether all the switches are simultaneously actuated. By means of such visual indicator lights the system can be tested by a procedure in which with all of the switches actuated, the bull gear drive 19 is slowly adjusted until the photosensor 47 detects a light through one of the slots 46 as indicated by the indicator light 48 (FIG. 6) provided for that purpose. Bull gear 14 is then adjusted one tooth, as determined by the photosensor 47, in a direction backing off from the die. If the machine is square the LS1-A, LS2-A, LS3-A and LS4-A limit switches will all be on as indicated by the indicator lights 51a, 52a, 53a, and 54a while all of the limit switches LS1-B, LS2-B, LS3-B, and LS4-B will all be deactuated as determined by the indicator lights 51b, 52b, 53b, and 54b. The next test in the autosquare testing is to rotate the bull gear in the opposite direction from the first direction in which it was rotated, the rotation being two teeth as determined by the photosensor 47 and its indicator light 48. In this position, the LS1-B, LS2-B, LS3-B, and LS4-B switches should be actuated while LS1-A, LS2-A, LS3-A, and LS4-A switches are deactuated. The next step is to resquare the machine by reactivating the logic circuit which causes the machine to be automatically squared in which all of the indicator lights 51a, 51b, 52a, 52b, 53a, 53b, 54a, and 54b are all on indicating that all of the limit switches are being actuated and thereby the tie bar nuts have the same relative orientation to the tie bars as when the machine was originally squared.

The automatic squaring can also be tested further by unbalancing the tie bar nut adjustments to render the machine out of square while the logic circuit is inactivated. Then the logic circuit is reactivated causing the logic circuit to perform in sequence the control of the operation of the bull gear drive 19 and the idler gear hydraulic cylinders 27 for resquaring tie rods 9, 7, 6 and 8 in a manner as above described until the machine is resquared.

Although the preferred embodiment of the present invention discloses a fully automatic system for resquaring a die casting machine, it should be understood that within the broadest aspect of this invention, it encompasses the use of semi-automatic or manual modes of operation using the adjustment system of the present system as above described. The semi-automatic mode of operation can be accomplished by providing, for example, manual actuated switches to provide input signals to the solenoid valves for the bull gear drive and to the idler gear cylinder controllers such that when the limit switches for the tie bar nuts indicate a tie bar needs adjustment, the operator can disengage all of the idler gears except the one associated with the tie bar nut that needs adjustment. These and various modifications of the preferred embodiment of the invention described and disclosed herein will become apparent to those skilled in the art and all fall within the spirit and scope of the invention as defined by the appended claims.

The embodiments of the invention in which an exclusive property or privilege is claimed is defined as follows:

1. In a die casting machine having front and rear end plates, a plurality of tie bars extending between said end plates, a traveling plate slidably mounted on said tie bars for movement between said end plates; means for moving said traveling plate toward said front plate for clamping molds therebetween during the casting operation and thereby exerting a strain on said tie bars; adjustable means at the ends of said tie bars adjacent said rear end plate for individually adjusting the tension exerted in each of said tie bars; separate strain detector means for each of said tie bars for individually detecting the tension on each of said tie bars; the improvement comprising:

position detector means at each of said adjustment means for separately and individually detecting the relative positions of the rear ends of each of said tie bars to said rear end plate; said detector means including an actuating means and at least two detectors spacedly mounted about said tie bar and arranged to both be simultaneously actuated by said actuating means when a desired tension is in said tie bar, one of said actuating means and said detectors being mounted on said adjustment means and the other of said detectors or actuating means being mounted stationary with respect to said adjustment means; whereby when the machine is originally squared by adjusting the adjustable means to cause a desired tension in each tie bar, the detectors are actuated and the orignal squared positions of said tie bars can be observed and after operation of said machine it can be resquared by adjusting said adjustable means to adjust said tie bars back to the said original squared positions.

2. The machine of claim 1 in which each tie bar extends through said rear end plate and said adjustment means includes threaded means on which is mounted an adjustment nut, said position detector means including actuating means mounted on said adjustment nut and circumferentially spaced detectors stationarily mounted with respect to said adjustment nut for detecting the position of said nut on said threaded means.

3. The machine of claim 2 in which said detector means for each of said tie bars comprises a pair of detectors mounted circumferentially about said tie bar; actuator means for causing each of said detectors to function in reponse to the rotatable position of said adjustment nut on said tie bar whereby said detectors indicate the direction of rotation of said adjustment nut required to readjust the said desired tension in said tie bar.

4. The machine of claim 3 in which the circumferential spacing of the detectors about each tie bar and the range in which said actuator means causes said detectors to function does not exceed 180°.

5. The machine of claim 3 in which the detectors are electrical switches and the actuator means is a member protruding into the path of the electrical switches.

6. The machine of claim 5 in which the actuator is attached to said adjustment nut and the electrical switches are mounted stationarily with respect to said adjustment nut.

7. The machine of claim 6 in which the actuator means is a portion of a ring extending circumferentially around a portion of the circumference of the adjustment nut and said switches have actuator elements extending into the path of said ring portions upon rotation of said adjustment nut.

8. The machine of claim 7 in which the circumferential spacing of said switches and the length of said ring portion which dictates the range in which said ring portion actuates said switches does not exceed 180°.

9. In a die casting machine having front and rear end plates, a plurality of tie bars extending between said end plates, a traveling plate slidably mounted on said tie bars for movement between said end plates; means for moving said traveling plate toward said front plate for clamping molds therebetween during the casting operation and thereby exerting a strain on said tie bars; adjustable means at the ends of said tie bars adjacent said rear end plate for individually adjusting the tension exerted on each of said tie bars; separate strain detector means for each of said tie bars for individually detecting the tension on each of said tie bars; the improvement comprising:

position detector means at each of said adjustment means for separately and individually detecting the relative positions of the rear ends of each of said tie bars to said rear end plate whereby when the machine is originally square by adjusting the adjustable means to cause a desired tension in each tie bar, the original squared positions of said tie bars can be observed and after operation of said machine it can be resquared by adjusting said adjustable means to adjust said tie bars back to the said original squared positions; said machine including each tie bar extending through said rear end plate and threaded means on which is mounted an adjustment nut, said position detector means including means for detecting the position of said nut on said threaded means; said detector for each of said tie bars comprising a pair of detectors mounted circumferentially about said tie bar; actuator means for causing each of said detectors to function in response to the rotatable position of said adjustment nut on said tie bar whereby said detectors indicate the direction of rotation of said adjustment nut required to readjust the said desired tension in said tie bar; said detectors for each of said tie bars also including an electrical means; one of said actuator means and electrical means being mounted on said adjustment nut and the other stationary with relation to adjustment of said adjustment nut.

10. The machine of claim 9 in which the actuator means is mounted on said adjustment nut and the electrical means being stationary with relation to the adjustment of said adjustment nut.

11. The machine of claim 9 in which the circumferential spacing of said electrical means about said the bar and the range in which said actuator means causes said electrical means to function does not exceed 180°.

12. The machine of claim 11 in which the actuator means is mounted on said adjustment nut and the electrical means being stationary with relation to the adjustment of said adjustment nut.

13. A system for adjusting tie bars in a die casting machine in order to readjust the squareness of the platens of said machine to a previously determined squareness comprising: a tie bar adjustment nut for each tie bar; a pair of detectors mounted circumferentially about each of said tie bars at said adjustment nut; an actuator means mounted on said tie bar adjustment nut for actuating said detectors in response to the position of said adjustment nut with respect to said tie bars; and responsive means responsive to the simultaneous actuation of both of the detectors of a tie bar by its adjustment nut to indicate whether or not said tie bar is in proper tension to satisfy the previously determined squareness of the platens and also responsive to the failure of said actuator means of its adjustment nut to actuate both detectors of a tie bar to indicate the direction of rotation of said adjustment nut required to readjust said proper tension in the tie bar.

14. The system of claim 13 in which the circumferential spacing of the detectors about each tie bar and the range in which said actuator means causes said detectors to function does not exceed 180°.

15. A system for adjusting tie bars in a die casting machine in order to readjust the squareness of the platens of said machine to a previously determined squareness comprising: a tie bar adjustment means for each tie bar; a pair of detectors mounted circumferentially about each of said tie bars at said adjustment means; an actuator associated with said tie bar adjustment means for actuating said detectors in response to the position of said adjustment means with respect to said tie bars whereby said detectors of each tie bar indicate whether or not said tie bar is in proper condition to satisfy the previously determined squareness of the platens; said adjustment means of each tie bar being an adjustment nut on the end of said tie bar, said adjustment nut being provided to adjust the tension in said tie bar; said detectors including means for detecting the position of said nut on said tie bar and said detectors for each tie bar including an electrical means; one of said actuator means and electrical means being mounted on said adjustment nut and the other stationary with relation to adjustment of said adjustment nut.

16. The system of claim 15 in which the electrical means is stationary with relation to the adjustment of said adjustment nut.

17. The system of claim 16 in which the detectors are electrical switches and the actuator means is a member protruding into the path of the electrical switches.

18. The system of claim 17 in which the actuator is attached to said adjustment nut and the electrical switches are mounted stationarily with respect to said adjustment nut.

19. The system of claim 18 in which the actuator means is a portion of a ring extending circumferentially around a portion of the circumference of the adjustment nut and said switches have actuator elements extending into the path of said ring portions upon rotation of said adjustment nut.

20. The system of claim 19 in which the circumferential spacing of said switches and the length of said ring portion which dictates the range in which said ring portion actuates saisd switches does not exceed 180°.

21. The system of claim 16 in which the circumferential spacing of said electrical means about said tie bar and the range in which said actuator means causes said electrical means to function does not exceed 180°.

22. The system of claim 15 in which the actuator means is mounted on said adjustment nut and the electrical means being stationary with relation to the adjustment of said adjustment nut.

23. In a die casting machine including front and rear end plates, a plurality of tie bars extending between said end plates, a traveling plate slidably positioned on said tie bars for movement between said end plates, each of said tie bars secured to one end plate by external threads positioned at one end of the tie bars, rotatable threaded adjustment nuts coupled to said one end plate and engaging said threads for adjustment of said tie bars, said adjustment nuts including external gear teeth, an idler gear for each of said adjustment nuts and engaging the external gear teeth of said adjustment nut, a centrally positioned bull gear for rotating said idler gears and adjustment nuts; drive means for said bull gear; separate means for selectively and individually moving each of said idler gears from a first position engaging said bull gear and an associated adjustment nut and a second position disengaging said bull gear and said associated adjustment nut; said means for moving said idler gears including shaft means for rotatably and slidably mounting each of said idler gears to said one end plate for movement between said first and second positions; said moving means for each of said idler gears further including a cylinder for sliding said idler gear on said shaft means between said first and second positions; a control circuit means coupled to said drive means for said bull gear and each of said cylinders; and said control circuit means including a separate control circuit for each of said tie bars; each of said separate control circuits including a detecting means for each of saiD tie bars for detecting a parameter directly relating to and representing the tension on an individual tie bar; said separate control circuits each being coupled to one of said cylinders for selectively coupling one or more threaded adjustment nuts with said bull gear for selectively adjusting said tie bars for automatically selectively and individually adjusting the tension of each of said tie bars within prescribed limits, the improvement for automatically resquaring the traveling plate and the front end plate to a previously determined squareness comprising:

a pair of detectors mounted circumferentially about each of said tie bars at said adjustment nuts, an actuator mounted on said adjustment nut for actuating said detectors in response to the position of said adjustment nut with respect to said tie bars; and responsive means responsive to the simultaneous actuation of both of the detectors of a tie bar by its adjustment nut to indicate whether or not said tie bar is in proper tension to satisfy the previously determined squareness of the platens and also responsive to the failure of said actuator means of its adjustment nut to actuate both dectectors of a tie bar to indicate the direction of rotation of said adjustment nut required to readjust said proper tension in the tie bar.

24. The system of claim 23 in which the circumferential spacing of the detectors about each tie bar and the range in which said actuator means causes said detectors to function does not exceed 180°.

25. In a die casting machine including front and rear end plates, a plurality of tie bars extending between said end plates, a traveling plate slidably positioned on said tie bars for movement between said end plates, each of said tie bars secured to one end plate by external threads positioned at one end of the tie bars, rotable threaded adjustment nuts coupled to said one end plate and engaging said threads for adjustment of said tie bars, said adjustment nuts including external gear teeth, an idler gear for each of said adjustment nuts and engaging the external gear teeth of said adjustment nut, a centrally positioned bull gear for rotating said idler gears and adjustment nuts; drive means for said bull gear; separate means for selectively and individually moving each of said idler gears from a first position engaging said bull gear and an associated adjustment nut and a second position disengaging said bull gear and said associated adjustment nut; said means for moving said idler gears including shaft means for rotatably and slidably mounting each of said idler gears to said one end plate for movement between said first and second positions; said moving means for each of said idler gears further including a cylinder for sliding said idler gear on said shaft means between said first and second positions; a control circuit means coupled to said drive means for said bull gear and each of said cylinders; and said control circuit means including a separate control circuit for each of said tie bars; each of said separate control circuits including a detecting means for each of said tie bars for detecting a parameter directly relating to and representing the tension on an individual tie bar; said separate control circuits each being coupled to one of said cylinders for seletively coupling one or more threaded adjustment nuts with said bull gear for selectively adjusting said tie bars for automatically selectively and individually adjusting the tension of each of said tie bars within prescribed limits, the improvement for automatically resquaring the traveling plate and the front end plate to a previously determined squareness comprising:

a pair of detectors mounted circumferentially about each of said tie bars at said adjustment nuts; an actuator associated with said adjustment nut for actuating said detectors in response to the position of said adjustment nut with respect to said tie bars whereby said detectors of each tie bar indicate whether or not said tie bar is in proper condition to satisfy the previously determined squareness of the platens; said detectors for each tie bar including an electrical means; one of said actuator means and electrical means being mounted on said adjustment nut and the other stationary with relation to adjustment of said adjustment nut.

26. The system of claim 25 in which the actuator means is mounted on said adjustment nut and the electrical means being stationary with relation to the adjustment of said adjustment nut.

27. The system of claim 25 in which the detectors are electrical switches and the actuator means is a member protruding into the path of the electrical switches.

28. The system of claim 27 in which the actuator is attached to said adjustment nut and the electrical switches are mounted stationarily with respect to said adjustment nut.

29. The system of claim 28 in which the actuator means is a portion of a ring extending circumferentially around a portion of the circumference of the adjustment nut and said switches have actuator elements extending into the path of said ring portions upon rotation of said adjustment nut.

30. The system of claim 29 in which the circumferential spacing of said switches and the length of said ring portion which dictates the range in which said ring portion actuates said switches does not exceed 180°.

31. The system of claim 25 in which the circumferential spacing of said electrical means about said tie rod and the range in which said actuator means causes said electrical means to function does not exceed 180°.

* * * * *

UNITED STATES PATENT AND TRADEMARK OFFICE
CERTIFICATE OF CORRECTION

PATENT NO. : 4,716,952

DATED : January 5, 1988

INVENTOR(S) : Robert W. Hegel et al.

It is certified that error appears in the above-identified patent and that said Letters Patent is hereby corrected as shown below:

[56] References Cited;
"Re. 32,084" should be --Re. 32,048--.

In the Abstract, line 8;
"resquarded" should be --resquared--.

Column 7, line 19;
"sequance" should be --sequence--.

Column 8, line 16;
"counterclockwise" should be --clockwise--.

Column 11, claim 9, line 7;
"square" should be --squared--.

Column 11, claim 11, line 36;
"the bar" should be --tie bar--.

Column 12, claim 20, line 37;
"saisd" should be --said--.

UNITED STATES PATENT AND TRADEMARK OFFICE
CERTIFICATE OF CORRECTION

PATENT NO. : 4,716,952
DATED : January 5, 1988
INVENTOR(S) : Robert W. Hegel et al It is certified that error appears in the above-identified patent and that said Letters Patent is hereby corrected as shown below:

Column 14, claim 31, line 55
"rod" should be --bar--.

Signed and Sealed this

Thirtieth Day of August, 1988

Attest:

DONALD J. QUIGG

*Attesting Officer*   *Commissioner of Patents and Trademarks*